(12) United States Patent
Sato

(10) Patent No.: US 12,263,889 B2
(45) Date of Patent: Apr. 1, 2025

(54) VEHICLE LOWER PART STRUCTURE

(71) Applicant: TOYOTA JIDOSHA KABUSHIKI KAISHA, Toyota (JP)

(72) Inventor: Toshiaki Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 356 days.

(21) Appl. No.: 17/950,574

(22) Filed: Sep. 22, 2022

(65) Prior Publication Data

US 2023/0182828 A1 Jun. 15, 2023

(30) Foreign Application Priority Data

Dec. 10, 2021 (JP) .................. 2021-200457

(51) Int. Cl.
*B62D 25/20* (2006.01)
*B62D 27/02* (2006.01)

(52) U.S. Cl.
CPC ......... *B62D 25/2036* (2013.01); *B62D 27/02* (2013.01)

(58) Field of Classification Search
CPC .... B60D 25/2036; B60D 27/02; B60D 25/20; B60K 1/04; B60K 2001/0438
See application file for complete search history.

(56) References Cited

U.S. PATENT DOCUMENTS

| 9,150,253 | B2 * | 10/2015 | Watanabe | ............ B62D 27/065 |
| 11,351,890 | B2 * | 6/2022 | Park | ................ B60N 2/015 |
| 2013/0075173 | A1 | 3/2013 | Kato et al. | |

FOREIGN PATENT DOCUMENTS

| JP | H01-057925 U | 4/1989 |
| JP | 2009-107424 A | 5/2009 |
| JP | 2010-095218 A | 4/2010 |
| JP | 2013-067334 A | 4/2013 |
| JP | 2021-172175 A | 11/2021 |
| KR | 20110051626 A * | 5/2011 |

* cited by examiner

*Primary Examiner* — Lori Lyjak
(74) *Attorney, Agent, or Firm* — Dinsmore & Shohl LLP

(57) ABSTRACT

A vehicle lower part structure includes a floor panel, a bracket fixed to the floor panel, and a component mounted on a lower side of the floor panel so as to be fastened by a fastener to the bracket. The floor panel has a convex portion. The bracket is provided so as to cover the convex portion from a lower side. The fastener includes a bolt and a nut. The bolt has a head located on a lower side of the bracket and a shaft extending upward from the head and inserted in a hole formed in the bracket. A distal end of the shaft is located in the internal space of the convex portion.

4 Claims, 4 Drawing Sheets

VEHICLE LOWER PART STRUCTURE

CROSS-REFERENCE TO RELATED APPLICATION

This application claims priority to Japanese Patent Application No. 2021-200457 filed on Dec. 10, 2021, incorporated herein by reference in its entirety.

BACKGROUND

1. Technical Field

The disclosure relates to a vehicle lower part structure in which a component, such as a battery, is mounted on the lower side of a floor panel.

2. Description of Related Art

Japanese Unexamined Patent Application Publication No. 2013-067334 (JP 2013-067334 A) describes a technology for mounting a battery on the lower side of a floor panel by fastening the battery with a fastener to a bracket protruding downward from a floor panel.

However, the technology of JP 2013-067334 A has the following inconvenience. Since the bracket protrudes downward from the floor panel, when the battery currently mounted on the lower side of the floor panel is detached from the bracket and a battery having a different shape from the detached battery or a battery larger than the detached battery is newly mounted on the lower side of the floor panel, the bracket can interfere with the new battery or the bracket can impair mounting of the new battery. It is also conceivable that a new battery is mounted on the lower side of the bracket that protrudes downward from the floor panel. In this case, an above ground level of the new battery is lowered, with the result that the new battery more easily interferes with a road surface.

SUMMARY

The disclosure provides a vehicle lower part structure capable of suppressing impairment of mounting a new component on a lower side of a floor panel due to a bracket.

An aspect of the disclosure relates to a vehicle lower part structure. The vehicle lower part structure includes a floor panel, a bracket fixed to the floor panel, and a component mounted on a lower side of the floor panel so as to be fastened by a fastener to the bracket. The floor panel has a convex portion that is convex upward such that an internal space is open downward. The bracket has a flat shape and is provided so as to cover the convex portion from a lower side. The fastener includes a bolt and a nut located on an upper side of the bracket, at least part of the nut is located in the internal space of the convex portion, and the bolt is screwed to the nut. The bolt has a head located on a lower side of the bracket and a shaft extending upward from the head and inserted in a hole formed in the bracket. A distal end of the shaft is located in the internal space of the convex portion.

With the above vehicle lower part structure, the floor panel has the convex portion that is convex upward such that the internal space is open downward, and the bracket has a flat shape and is provided so as to cover the convex portion from the lower side. Therefore, it is possible to reduce downward projection of the bracket from the floor panel in comparison with the case where the bracket is provided so as to project downward from the floor panel. Therefore, when a currently mounted component, such as a battery, is detached from the bracket and a component having a different shape from the detached component or a component larger than the detached component is newly mounted on the lower side of the floor panel, it is possible to reduce interference of the new component with the bracket. Thus, it is possible to suppress impairment of mounting a new component due to the bracket.

At least part of the nut is located in the internal space of the convex portion, and the distal end of the shaft of the bolt is located in the internal space of the convex portion, so the nut and the shaft of the bolt are able to be accommodated in the internal space of the convex portion. Thus, even when the bracket has a flat shape, it is possible to suppress impairment of fastening by the fastener due to the floor panel.

In the vehicle lower part structure of the above aspect, a cross member may be joined to a top surface of the floor panel. The cross member may have a top wall, a pair of side walls, and a flange provided at a lower end of each of the side walls. The convex portion of the floor panel may be convex in a direction to approach the top wall between the side walls of the cross member.

With the above vehicle lower part structure, since the convex portion of the floor panel is convex in a direction to approach the top wall between the side walls of the cross member, the convex portion of the floor panel is able to be accommodated in the internal space of the cross member. Therefore, the convex portion of the floor panel does not appear in a passenger compartment of the vehicle, so a wide foot space of the passenger compartment is ensured.

In the vehicle lower part structure of the above aspect, the bracket may be joined to the floor panel together with flanges of the cross member.

With the above vehicle lower part structure, since the bracket is joined to the floor panel together with the flanges of the cross member, the stiffness of a joint between the bracket and the floor panel is improved.

The vehicle lower part structure of the above aspect may further include a reinforcement patch provided on a top surface of the bracket to suppress a deformation of the bracket.

With the above vehicle lower part structure, since the reinforcement patch is provided on the top surface of the bracket, even when the bracket has a flat shape, a deformation of the bracket in an up and down direction is reduced.

In the vehicle lower part structure of the above aspect, the reinforcement patch may have upright portions extending upward on both sides of the fastener.

With the above vehicle lower part structure, since the reinforcement patch includes the upright portions extending upward on both sides of the fastener, the stiffness of the reinforcement patch is increased in comparison with the case where the reinforcement patch does not include upright portions, a deformation of the bracket in the up and down direction is effectively reduced by the reinforcement patch.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
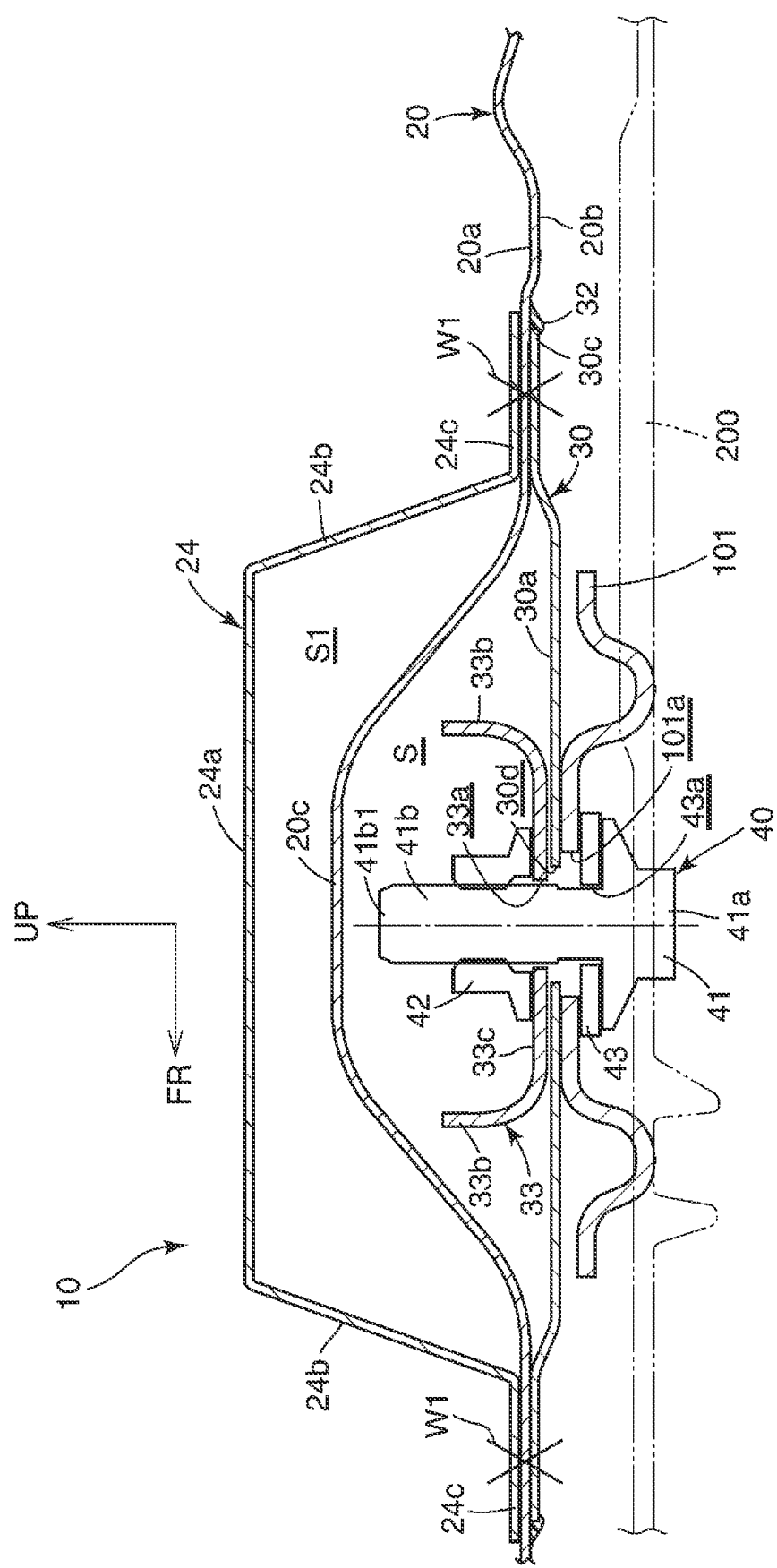
FIG. 1 is a sectional view of a vehicle lower part structure according to an embodiment of the disclosure.

Hereinafter, a vehicle lower part structure 10 according to an embodiment of the disclosure will be described with reference to the accompanying drawings. In the drawings, UP indicates the upper side of a vehicle, FR indicates the front side of the vehicle, and W indicates the width direction of the vehicle.

Figure 3:
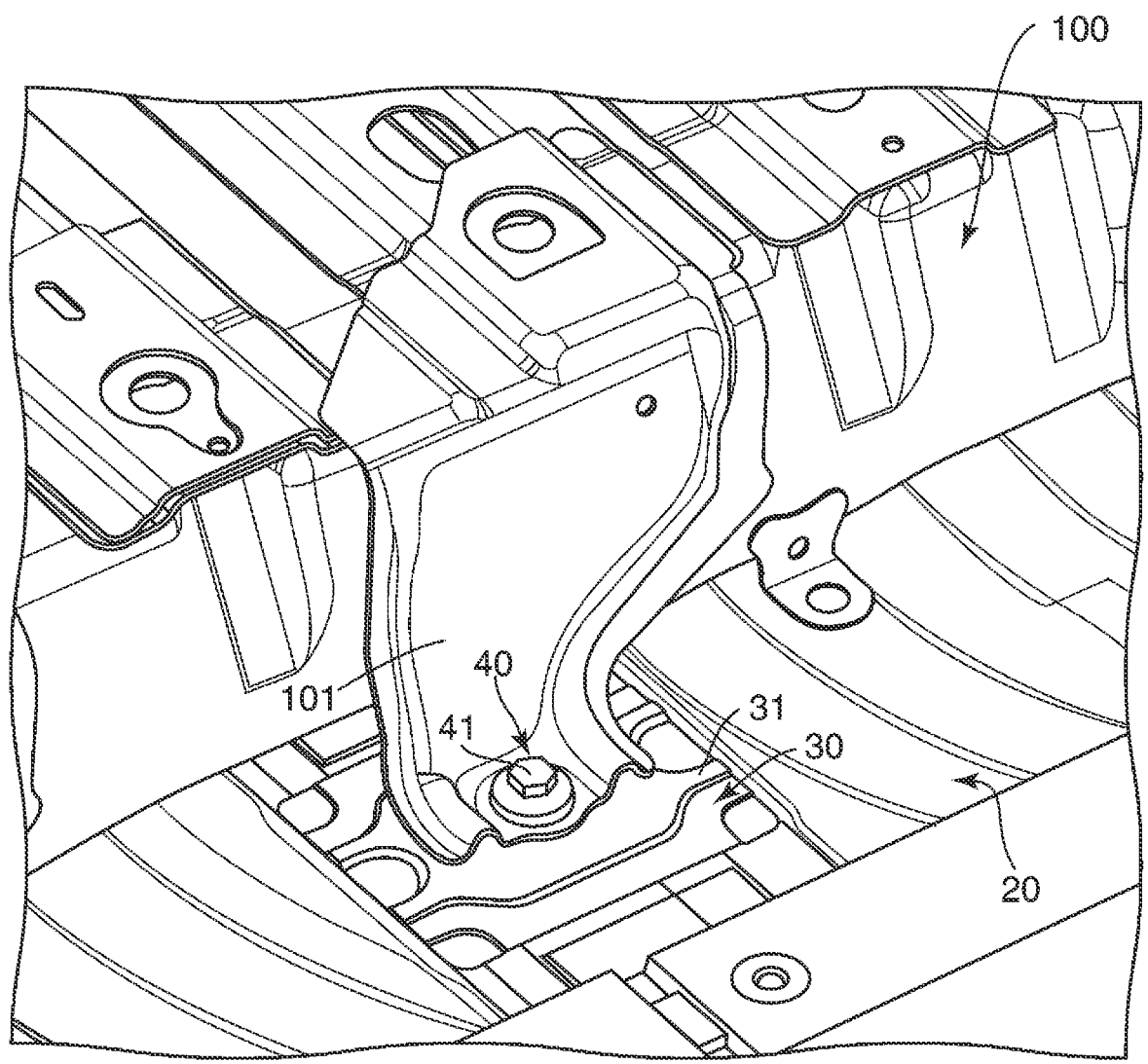
FIG. 3 is a perspective view of a bracket and its neighborhood in the vehicle lower part structure according to the embodiment of the disclosure when viewed from a lower side of a vehicle.

As shown in FIG. 1 and FIG. 3, the vehicle lower part structure 10 according to the embodiment of the disclosure is a structure in which a component 100 is mounted on the lower side of a floor panel 20 so as to be fastened by a fastener 40 to a bracket 30 fixed to a floor panel 20 of the vehicle. The component 100 is not limited and is, for example, a battery.

Figure 2:
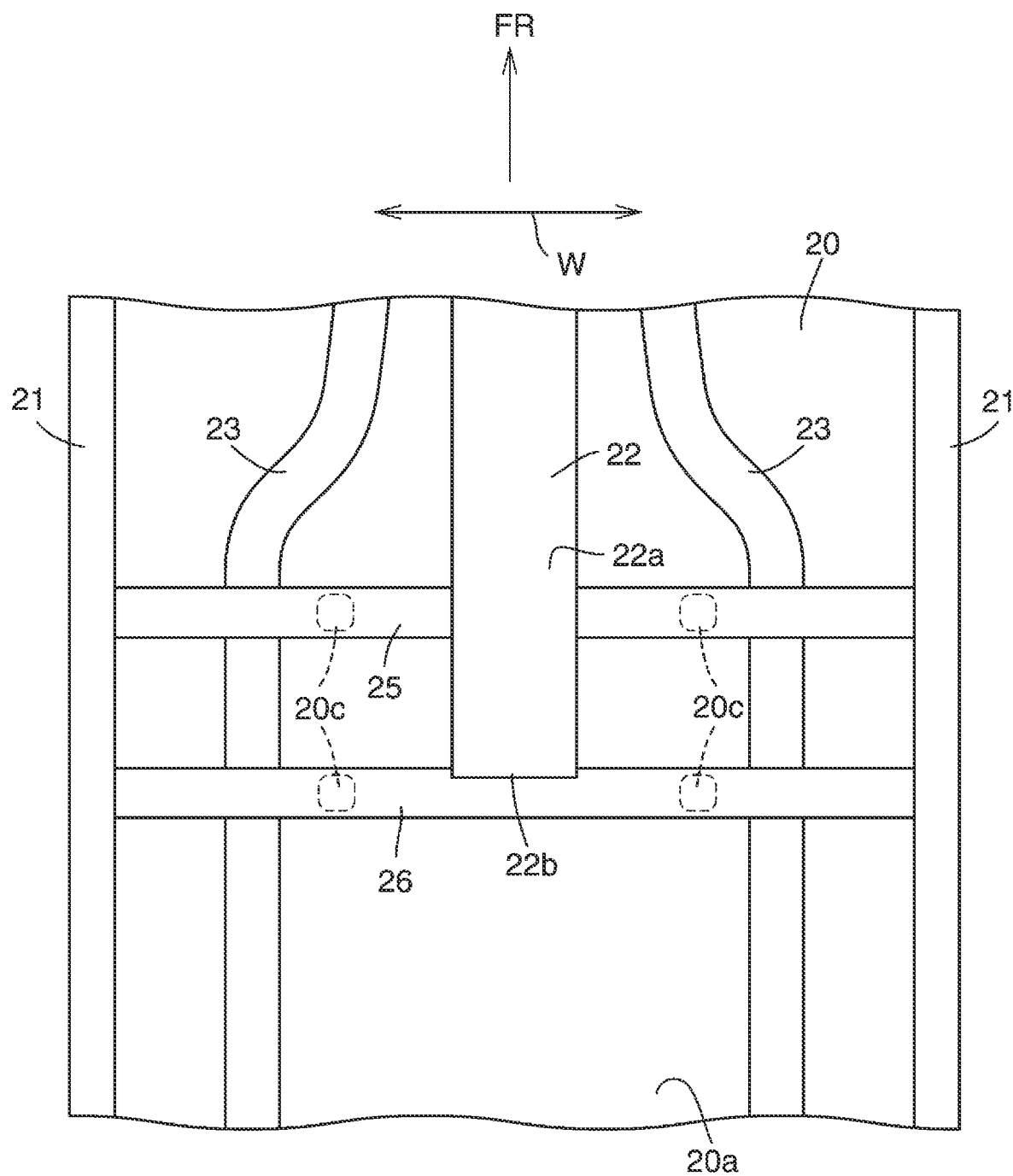
FIG. 2 is a schematic partially plan view of the vehicle lower part structure according to the embodiment of the disclosure.

As shown in FIG. 2, the floor panel 20 is a panel that makes up a floor at the lower part of the vehicle. The floor panel 20 is, for example, a front floor panel provided so as to extend from the lower end of a dash panel (not shown) toward the rear side of the vehicle. The floor panel 20 is not limited to the front floor panel and may be a rear floor panel or the like although not shown in the drawing.

The floor panel 20 may be made up of a single component or may be made up of multiple components. When the floor panel 20 is made up of multiple components, all the components are joined into the single floor panel 20. Rocker inner panels 21, a center reinforcement 22, outer reinforcements 23, and cross members 24 are provided on the floor panel 20.

The rocker inner panels 21 are provided so as to extend in the vehicle front and rear direction respectively at both ends of the floor panel 20 in the vehicle width direction. Each of the rocker inner panels 21 is provided so as to be continuous all over the range of the floor panel 20 in the vehicle front and rear direction. Each of the rocker inner panels 21 is joined to a rocker outer panel (not shown) provided on the outer side of the rocker inner panel 21 in the vehicle width direction to make up a rocker having a closed sectional shape.

The center reinforcement 22 is provided at the center of the floor panel 20 in the vehicle width direction. The center reinforcement 22 is joined to a top surface 20a of the floor panel 20. The center reinforcement 22 is provided so as to extend in the vehicle front and rear direction from the vehicle front-side end of the floor panel 20 to the middle part of the floor panel 20 in the vehicle front and rear direction. The top surface 22a of the center reinforcement 22 inclines rearward and downward of the vehicle.

The outer reinforcements 23 are provided so as to extend in the vehicle front and rear direction on the inner side of the rocker inner panels 21 in the vehicle width direction and on the outer side of the center reinforcement 22 in the vehicle width direction. Each of the outer reinforcements 23 is provided so as to be continuous all over the range of the floor panel 20 in the vehicle front and rear direction. The outer reinforcements 23 are joined to the top surface 20a of the floor panel 20.

The cross members 24 are provided so as to extend in the vehicle width direction between the right and left rocker inner panels 21. Each of the cross members 24 is provided so as to be continuous all over the range of the floor panel 20 in the vehicle width direction. The number of the cross members 24 provided on the floor panel 20 may be one or may be two or more. FIG. 2 shows the case where two cross members 24 are provided. The two cross members 24 include a front cross member 25 and a rear cross member 26. The front cross member 25 is provided so as to extend in the vehicle width direction through the middle part of the center reinforcement 22 in the vehicle front and rear direction. The rear cross member 26 is located on the vehicle rear side of the front cross member 25 and is joined to the vehicle rear-side end 22b of the center reinforcement 22.

As shown in FIG. 1, the cross member 24 has a hat shape in cross section and opens downward and includes a top wall 24a, a pair of side walls 24b, and a flange 24c provided at the lower end of each of the side walls 24b. The cross member 24 is joined to the top surface 20a of the floor panel 20 at the flanges 24c.

The floor panel 20 has convex portions 20c having a U-shape in cross section. Each of the convex portions 20c is convex upward such that the internal space S is open downward. Each convex portion 20c has, for example, such a shape that part of the floor panel 20 is bulged upward. The plan view shape of the convex portion 20c is not limited and may be a rectangular shape (including a substantially rectangular shape of which four corners are rounded), may be a polygonal shape other than a rectangular shape, may be a circular shape, or may be an elliptical shape or the like.

The convex portion 20c has no hole extending through the floor panel 20. This is to prevent entry of water or outside air present on the lower side of the floor panel 20 through the hole to the upper side of the floor panel 20.

The convex portion 20c is accommodated in an internal space S1 of the cross member 24, and is located at a position covered with the cross member 24 from above. In other words, the convex portion 20c is convex in a direction to approach the top wall 24a between the side walls 24b of the cross member 24.

As shown in FIG. 2, each of the convex portions 20c is provided at a position on the outer side of the center reinforcement 22 in the vehicle width direction and on the inner side of the outer reinforcement 23 in the vehicle width direction. The convex portion 20c may be provided only at a position covered with the front cross member 25, may be provided only at a position covered with the rear cross member 26, or may be provided at both the position covered with the front cross member 25 and the position covered with the rear cross member 26. The number of the convex portions 20c provided at positions covered with the front cross member 25 may be one or may be two or more. The number of the convex portions 20c provided at positions covered with the rear cross member 26 may be one or may be two or more.

As shown in FIG. 3, the bracket 30 is provided to attach the component 100, such as a battery, to the floor panel 20 (mounting the component 100 on the lower side of the floor panel 20). The bracket 30 is made up of a single component and has a flat shape. The "flat shape" includes a substantially flat shape in which beads 31, ribs, or the like for enhancing the stiffness are provided. As shown in FIG. 1, the bracket 30 is provided so as to cover (close) the overall convex portion 20c (the internal space S of the convex portion 20c) from the lower side. This is to suppress corrosion of a top surface 30a of the bracket 30 by preventing entry of water outside the vehicle into between the bracket 30 and the floor panel 20. To prevent entry of water into between the bracket 30 and the floor panel 20, a sealant 32 that closes the gap between an edge 30c of the bracket 30 and the floor panel 20 may be continuously applied all around the bracket 30.

The bracket 30 is joined to a lower surface 20b of the floor panel 20 at a surrounding part of the convex portion 20c. The bracket 30 is joined to the floor panel 20 together with the flanges 24c of the cross member 24 by, for example, spot welding or laser screw welding (LSW). The reference sign W1 in FIG. 1 indicates welding among the bracket 30, the floor panel 20, and the cross member 24.

A reinforcement patch 33 may be provided on the top surface 30a of the bracket 30 to reduce a deformation of the bracket 30 in the up and down direction. However, the reinforcement patch 33 is not an indispensable component. The reinforcement patch 33 is a sheet component and is joined to the top surface 30a of the bracket 30 by spot welding or the like. Holes 30d, 33a are respectively provided in the bracket 30 and the reinforcement patch 33. A bolt 41 of the fastener 40 is inserted through the holes 30d, 33a. The reinforcement patch 33 has upright portions 33b extending upward on both sides of the fastener 40. The upright portions 33b extend upward in the internal space S of the convex portion 20c and terminate in the internal space S.

The fastener 40 includes the bolt 41 and a nut 42 to which the bolt 41 is screwed.

The bolt 41 has a head 41a located on the lower side of the bracket 30 and a shaft 41b extending upward from the head 41a. A component bracket 101 provided on the component 100 (see FIG. 3) is sandwiched together with a washer 43 between the head 41a and the bracket 30. The shaft 41b is inserted through holes 43a, 101a, 30d, 33a respectively provided in the washer 43, the component bracket 101, the bracket 30, and the reinforcement patch 33 and screwed to the nut 42. A distal end (upper end) 41b1 of the shaft 41b is located in the internal space S of the convex portion 20c.

The nut 42 is located on the upper side of the bracket 30 and the reinforcement patch 33, and at least part of the nut 42 is located in the internal space S of the convex portion 20c. The nut 42 is joined to the top surface 33c except the upright portions 33b of the reinforcement patch 33. The nut 42 is a weld nut. The nut 42 is joined to the reinforcement patch 33 by, for example, crushing a projection (not shown) formed on the nut 42 to be welded by projection welding or the like.

Next, the operation and effects of the embodiment of the disclosure will be described.

When the vehicle is a plug-in hybrid electric vehicle (PHEV), a fuel tank can be mounted, and a battery can be mounted on the lower side of a floor panel. Then, there is a need for up-converting the vehicle by detaching the fuel tank and the battery for PHEV and newly mounting a battery for battery electric vehicle (BEV) different from a battery for PHEV on the lower side of the floor panel.

Figure 4:
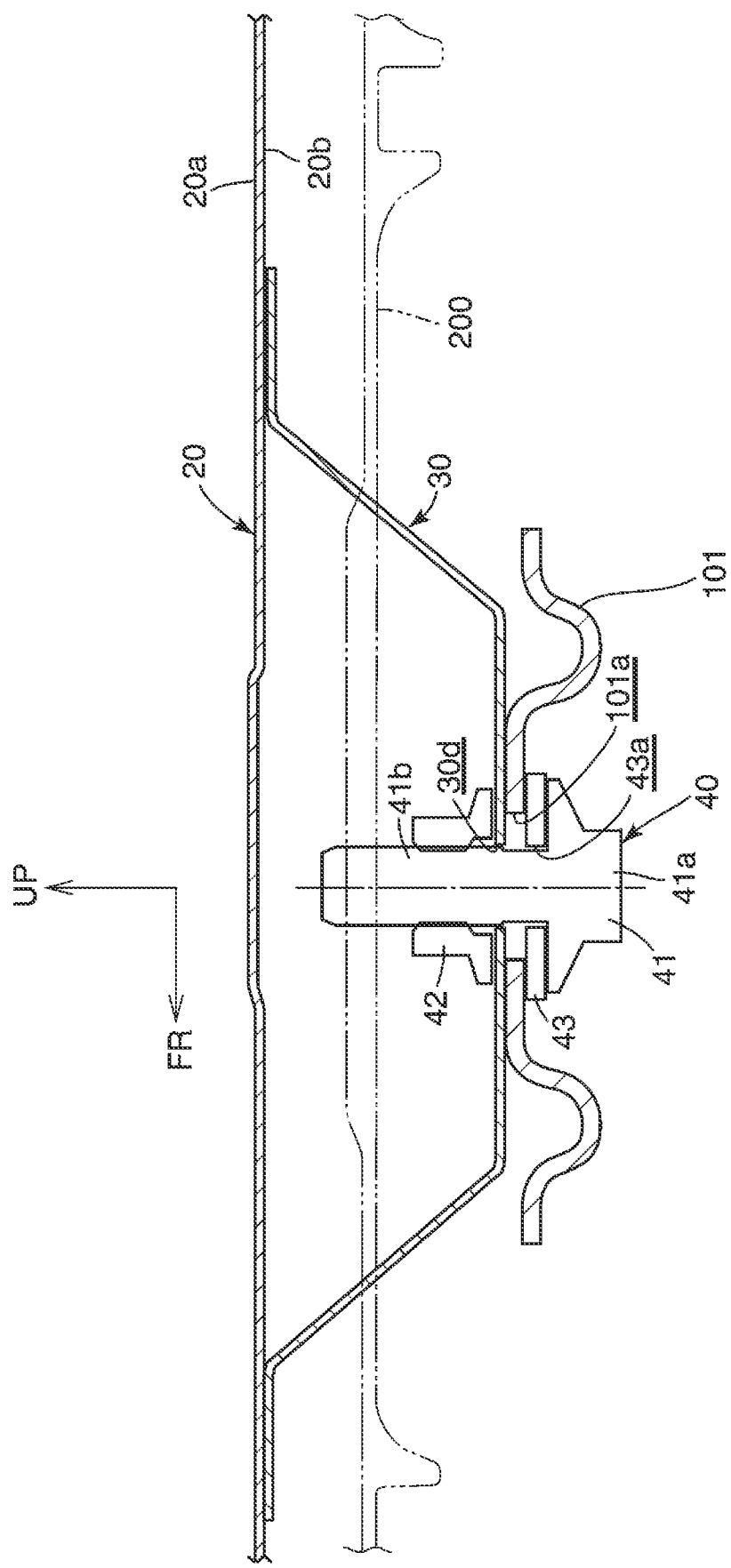
FIG. 4 is a sectional view of a vehicle lower part structure in a comparative example different from the embodiment of the disclosure.

Here, FIG. 4 shows a comparative example different from the embodiment of the disclosure. In the comparative example as well, like reference signs denote components corresponding to the components of the embodiment of the disclosure for the sake of convenience of description. The comparative example shows the case where the bracket 30 does not have a flat shape and is provided so as to project downward from the floor panel 20.

In the comparative example, when the component 100 currently mounted on the lower side of the floor panel 20 is detached from the bracket 30 and a component (not shown) having a different shape from the detached component 100 or a component 200 larger than the detached component 100 is newly mounted on the lower side of the floor panel 20, the bracket 30 and the new component 200 may interfere with each other. As a result, the bracket 30 may impair mounting of the new component 200. Therefore, it may be difficult to up-convert the vehicle.

In contrast, in the embodiment of the disclosure, as shown in FIG. 1, the floor panel 20 includes the convex portions 20c that are convex upward such that the internal space S is open downward, and each bracket 30 has a flat shape and is provided so as to cover the convex portion 20c from the lower side. Therefore, it is possible to reduce projection of the bracket 30 downward from the floor panel 20 in comparison with the case where the bracket 30 is provided so as to project downward from the floor panel 20.

Therefore, when the currently mounted component 100 is detached from the bracket 30 and a component (not shown) having a different shape from the detached component 100 or a component 200 larger than the detached component 100 is newly mounted on the lower side of the floor panel 20, it is possible to reduce interference of the new component 200 with the bracket 30. Thus, it is possible to suppress impairment of mounting the new component 200 due to the bracket 30. As a result, in comparison with the comparative example, it is possible to easily up-convert the vehicle.

At least part of the nut 42 is located in the internal space S of the convex portion 20c, and the distal end 41b1 of the shaft 41b of the bolt 41 is located in the internal space S of the convex portion 20c. Therefore, the nut 42 and the shaft 41b of the bolt 41 are able to be accommodated in the internal space S of the convex portion 20c. Thus, even when the bracket 30 has a flat shape, it is possible to suppress impairment of fastening with the fastener 40 due to the floor panel 20.

Since the convex portion 20c of the floor panel 20 is convex in a direction to approach the top wall 24a between the side walls 24b of the cross member 24, the convex portion 20c of the floor panel 20 is able to be accommodated in the internal space S1 of the cross member 24. Therefore, the convex portion 20c of the floor panel 20 does not appear in a passenger compartment of the vehicle, so a wide foot space of the passenger compartment is ensured.

Since the bracket 30 is joined to the floor panel 20 together with the flanges 24c of the cross member 24, the stiffness of a joint between the bracket 30 and the floor panel 20 is improved.

Since the reinforcement patch 33 is provided on the top surface 30a of the bracket 30, even when the bracket 30 has a flat shape, a deformation of the bracket 30 in the up and down direction is reduced.

Since the reinforcement patch 33 includes the upright portions 33b extending upward on both sides of the fastener 40, the stiffness of the reinforcement patch 33 is increased in comparison with the case where the reinforcement patch 33 does not include upright portions 33b, a deformation of the bracket 30 in the up and down direction is effectively reduced by the reinforcement patch 33.

Since the convex portion 20c has no hole extending through the floor panel 20, entry of water and outside air present on the lower side of the floor panel 20 to the upper side of the floor panel 20 through the hole is prevented.

Since the bracket 30 is provided so as to cover (close) the overall convex portion 20c (the internal space S of the convex portion 20c) from the lower side, corrosion of the top surface 30a of the bracket 30 is suppressed by preventing entry of water outside the vehicle to between the bracket 30 and the floor panel 20.

What is claimed is:

1. A vehicle lower part structure comprising:
    a floor panel;
    a bracket fixed to the floor panel;
    a cross member joined to a top surface of the floor panel; and
    a component mounted on a lower side of the floor panel so as to be fastened by a fastener to the bracket, wherein:
    the floor panel has a convex portion that is convex upward such that an internal space is open downward;
    the bracket has a flat shape and is provided so as to cover the convex portion from a lower side;
    the fastener includes a bolt and a nut located on an upper side of the bracket, at least part of the nut is located in the internal space of the convex portion, and the bolt is screwed to the nut;
    the bolt has a head located on the lower side of the bracket and a shaft extending upward from the head and inserted in a hole formed in the bracket, and a distal end of the shaft is located in the internal space of the convex portion;
    the cross member has a top wall, a pair of side walls, and a flange provided at a lower end of each of the side walls; and
    the convex portion of the floor panel is convex in a direction to approach the top wall between the side walls of the cross member.

2. The vehicle lower part structure according to claim 1, wherein the bracket is joined to the floor panel together with the flanges of the cross member.

3. The vehicle lower part structure according to claim 1, further comprising a reinforcement patch provided on a top surface of the bracket to suppress a deformation of the bracket.

4. The vehicle lower part structure according to claim 3, wherein the reinforcement patch has upright portions extending upward on both sides of the fastener.

* * * * *